United States Patent Office 3,128,846
Patented Apr. 14, 1964

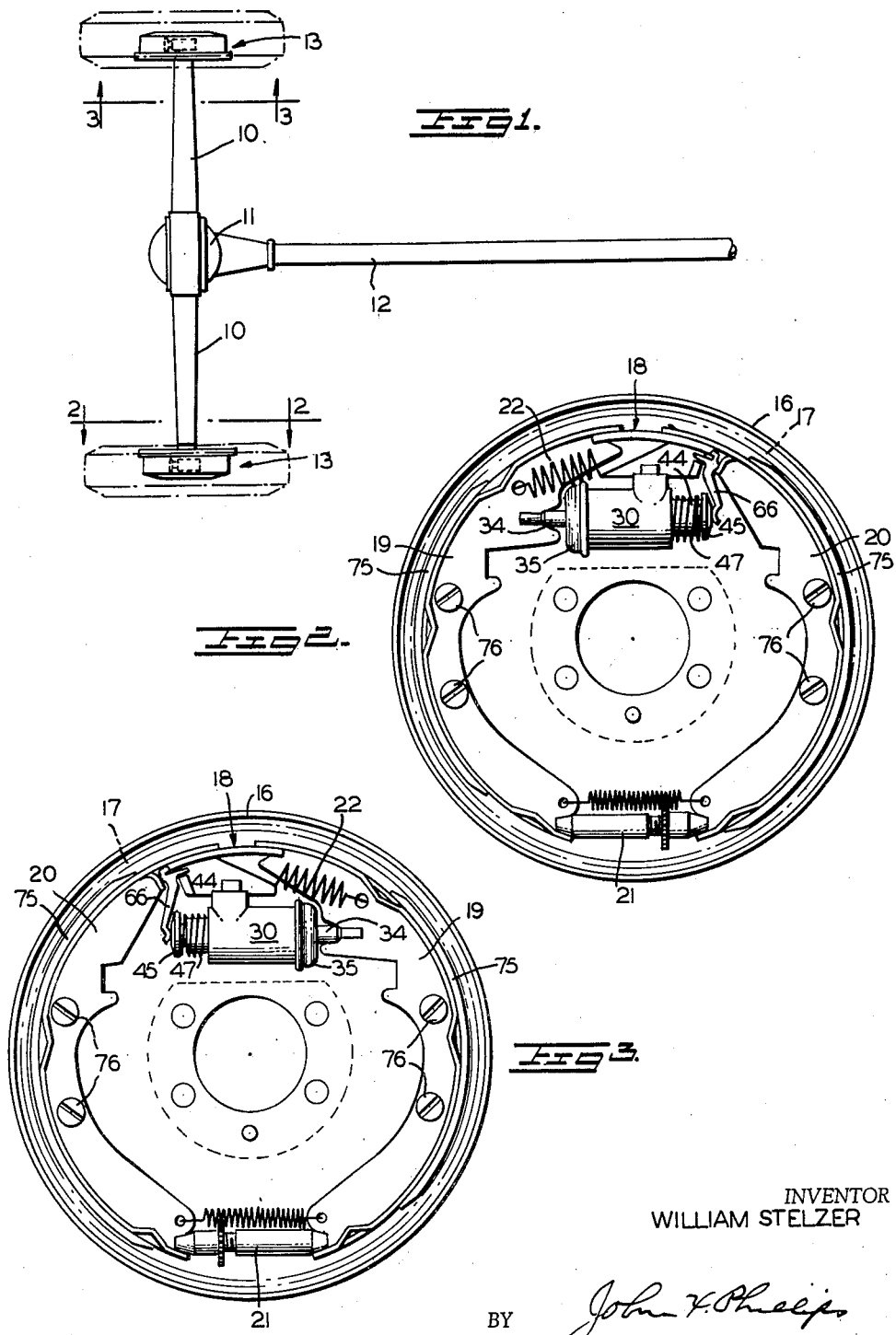

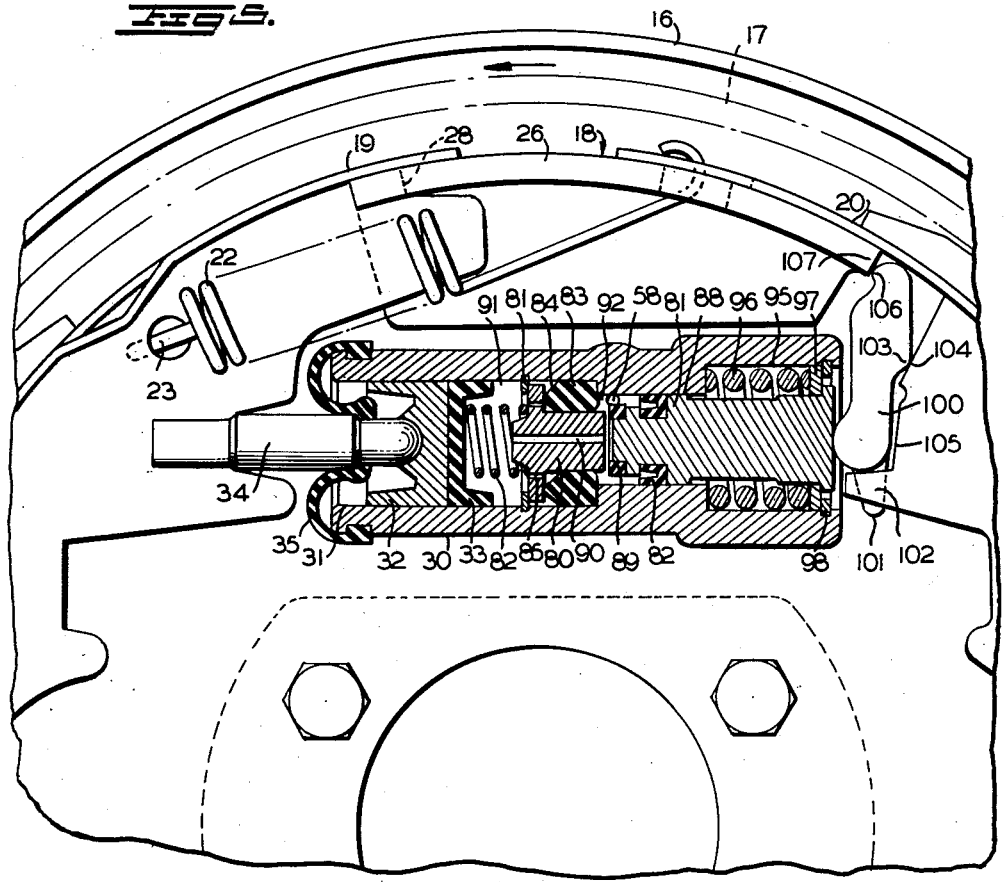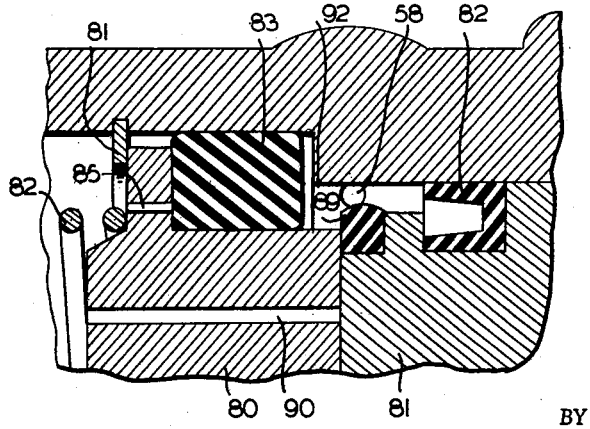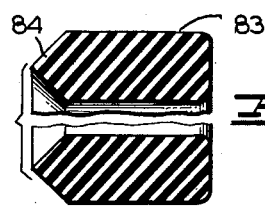

3,128,846
VEHICLE WHEEL BRAKE HAVING TORQUE RESPONSIVE WEIGHT TRANSFER COMPENSATING MEANS
William Stelzer, Bloomfield Hills, Mich., assignor to Kelsey-Hayes Company, Romulus, Mich., a corporation of Delaware
Filed July 10, 1962, Ser. No. 208,763
13 Claims. (Cl. 188—78)

This invention relates generally to vehicle wheel brakes and particularly to rear vehicle wheel brakes having torque responsive weight transfer compensating means embodied therein.

It is well known that during vehicle deceleration there is a transfer forwardly of vehicle body weight which results in reducing the weight supported by the rear wheels and increasing the weight supported by the front wheels. Accordingly it is relatively easy with conventional hydraulic brake systems to over-brake at the rear wheels, causing such wheels to lock and slide over the road surface. This is highly disadvantageous for reasons which are well known. Deceleration of a vehicle is a result of the brake torques of all of the wheels combined and there is no indication of the torque output of the individual brakes. This could be obtained only by measuring the torque at each brake.

An important object of the present invention is to proportion the hydraulic pressure at each rear brake according to its torque output so that if there is a difference due to lining friction or other causes, there is a tendency to equalize the torque output of one rear brake with respect to the other.

A further object is to provide a novel type of rear wheel brake mechanism in which, after the brake torque reaches a predetermined value, functions to provide a gradually increasing braking pressure which is lower than the rate of pressure increase in the master cylinder.

A further object is to provide such a mechanism wherein the front and rear brakes are applied with equal pressures up to a predetermined point after which the rear brakes are applied with progressively lower pressure relative to pressures applied to the front brakes, thus providing the desired maximum total brake torque which is limited at the rear wheels and equalized therebetween so as to minimize or prevent the locking and sliding of the rear wheels for providing a greater brake application at the front wheels where greater braking pressures can be tolerated.

Other objects and advantages of the invention will become apparent during the course of the following description.

In the drawings I have shown two embodiments of the invention. In this showing

FIGURE 1 is a plan view of a rear vehicle axle assembly and associated elements, the rear tires being shown in broken lines;

FIGURE 2 is an enlarged sectional view on line 2—2 of FIGURE 1;

FIGURE 3 is a similar view on line 3—3 of FIGURE 1, which is identical with FIGURE 2 except that the parts are shown in reverse since the sections of FIGURES 2 and 3 are taken looking in opposite directions;

FIGURE 6 is an enlarged fragmentary sectional view of a portion of the mechanism shown in FIGURE 5 showing a pressure deformable member in fully deformed condition;

FIGURE 7 is an enlarged detailed sectional view of the deformable member referred to; and FIGURE 8 is a graph showing relative braking pressures at the front and rear wheels under different conditions.

Figure 4:
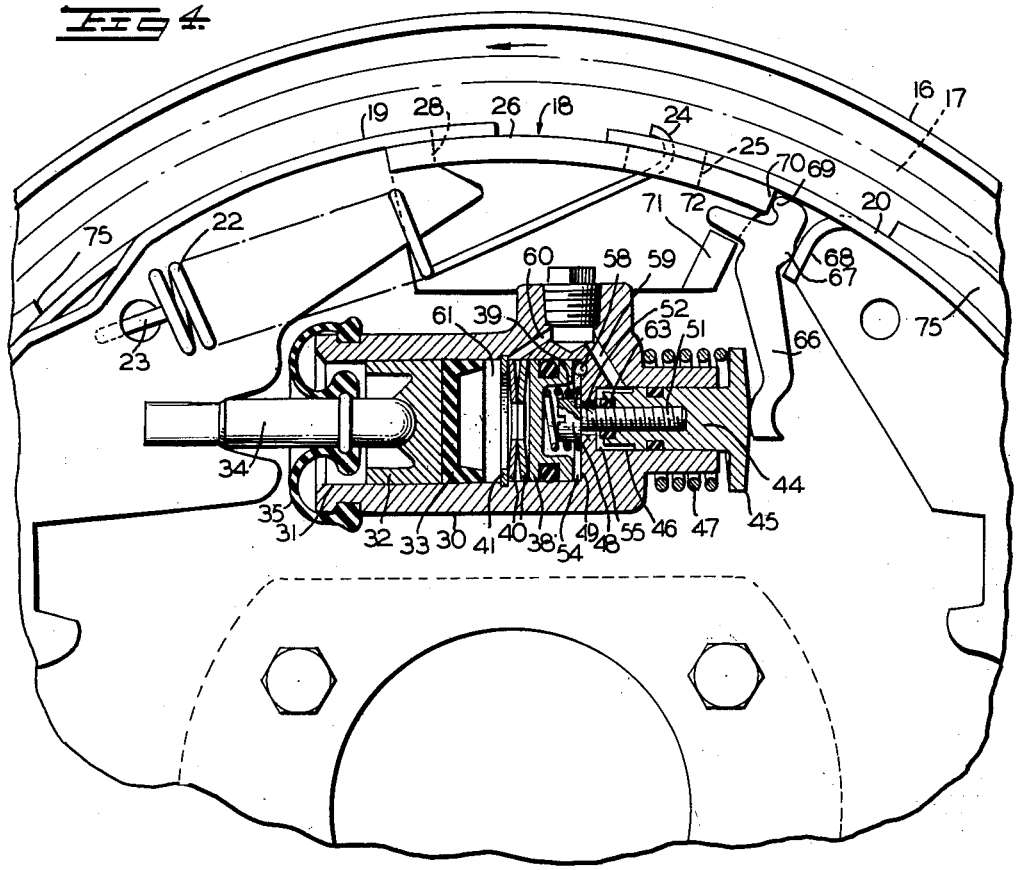
FIGURE 4 is an enlarged fragmentary sectional view of the drum and brake cylinder looking in the same direction as in FIGURE 2.

The invention is shown applied to a vehicle assembly including rear axle housings 10 between which is arranged a conventional differential 11 forwardly of which is arranged the propeller shaft assembly 12. At the outer end of each axle section 10 is arranged a braking assembly indicated as a whole with the numeral 13 and illustrated in detail in FIGURES 2, 3 and 4.

The assembly referred to comprises a backing plate 16 within which rotates the usual brake drum 17. An anchor plate 18 is fixed to the backing plate 16 and supports in a manner to be described primary and secondary brake shoes 19 and 20 respectively, the lower ends of which are provided with a conventional adjusting means 21. The upper ends of the shoes are biased toward each other by the usual spring 22, secured to the primary shoe as at 23 and to the secondary shoe as at 24 through an opening 25 formed in the flange 26 of the anchor 18. The free end of the primary shoe engages at the point 28 against the end of the flange 26 of the anchor 18.

A wheel cylinder 30 is arranged between the free ends of the shoes and is provided with a bore 31 in which is slidable a piston 32 provided with a seal 33. A rod 34 is connected between the piston 32 and primary shoe 19 and a boot 35 is provided between this rod and the wheel cylinder 30.

A second piston 38 is slidable in the bore 31 and is urged by a helical spring 39 against Belleville springs 40 resting against a retaining ring 41. A valve piston 44, having a head 45 extends through a bore 46 in the wheel cylinder and is urged to normal position by a spring 47. Movement of the piston 44 to such position is limited by a screw head 48 engaging the adjacent end wall 49 of the bore 31. The screw head 48 is carried by a screw 51 threaded into the piston 44 and having clearance as at 52 to form a passage between a chamber 54 to the right of the piston 38 and a chamber 55 at the right-hand end of the passage 52. Master cylinder fluid flows to the chamber 54 through a port 58 and normally into the chamber 55, from which the fluid flows through passages 59 and 60 into the chamber 61 formed between the seal 33 and piston 38. Under predetermined conditions, communication between the chambers 54 and 55 is closed by a valve seal 63 bonded to the piston 44.

The piston head 45 is engaged by the relatively long inner end of a lever 66 having a fulcrum 67 engaging against an inturned flange 68 of the secondary shoe 20. The lever 66 further has an end 69 engaging the adjacent end 70 of the anchor 18. The anchor 18 is provided with a projection 71 forming with the anchor flange 26 a space receiving a finger 72 formed on the lever 66 to retain the lever in position.

As will be more clearly understood below, the cross sectional area of the piston 44 is reduced in relation to that of the piston 32 according to the lever arm ratios of the lever 66 so that hydraulic forces are balanced out and the force acting on the spring 47 represents the brake torque without the influence of hydraulic pressure on piston 32. The hydraulic pressure acting on piston 32 is transmitted through the shoes to lever 66. This force is counteracted by piston 44 so that spring 47 opposes only a force proportional to the brake torque.

It will be understood of course that the operation of the wheel cylinder moves the free end of the primary shoe to engage conventional linings 75 with the brake drum 17 to apply the brakes. During movement thereof, the brake shoes are maintained in position relative to the backing plate 16 by conventional hold-down pins 76 (FIGURES 2 and 3).

Figure 5:
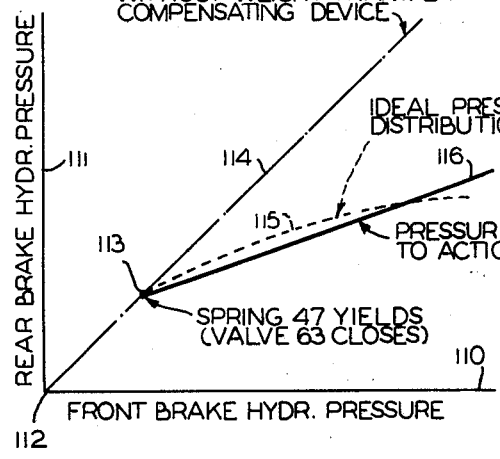
FIGURE 5 is a similar view of a modified form of the invention.

In FIGURES 5, 6 and 7 a modified form of the device is illustrated. Parts common to the two forms of the invention are indicated by the same reference numerals. In the modified form the piston 38 is replaced by a piston-like body 80 which is limited in its movement in one direction by a snap ring 81. A biasing spring 82 tends to move the body 80 to the right in FIGURE 1, but this body is backed up by a resilient body 83 normally shaped as shown in FIGURES 5 and 7 with a tapered left-hand end 84 to facilitate the deforming of the body 83 under conditions to be described. The body 80 is apertured as at 85. The deformable body 83 is arranged in the bore 31, and to the right of such bore is formed a second bore 88 in the wheel cylinder 30 to receive a piston 81 sealed in the bore as at 82. The left-hand end of the piston 81 constitutes a valve having a rubber or similar seal 89 bonded thereto and normally spaced from the adjacent end of the body 80. This body is provided with an axial bore 90 communicating between the chamber 91 in which the spring 82 is arranged and a chamber 92 in which the left-hand end of the piston 81 is arranged. The inlet port 58 from the master cylinder communicates with the chamber 92 and the latter chamber normally communicates through the passage 90 with the chamber 91.

An enlarged bore 95 in the right-hand end of the master cylinder contains a spring 96 the right-hand end of which engages a pick-up and bearing ring 97 and biases the piston 81 to its normal position. Such movement is limited by a snap ring 98.

A different lever 100 is employed having its lower end in FIGURE 5 engaging the adjacent end of the piston 81 and retained in position by fingers 101 straddling a finger 102 carried by the secondary shoe 20. The lever 100 is provided with a fulcrum 103 engaging an edge 104 formed on the shoe 20. This edge continues downwardly as at 105 normally in slightly spaced relation to the lower end of the lever 100 and engageable thereby in reverse braking to transmit a force from the piston 81 to the secondary shoe 20. The upper end 106 of the lever 100 engages the adjacent end 107 of the anchor 18.

The graph in FIGURE 8 illustrates the relative distribution of braking forces between the front and rear wheels. The axis of abscissas is indicated by the numeral 110 and represents front brake hydraulic pressure while the axis of ordinates, 111, represents rear brake hydraulic pressures. In braking, pressures increase equally in the front and rear brakes from the zero point 112 up to an intermediate point 113, and in the absence of the present invention, the pressures would increase throughout the braking range equally in the front and rear brakes beyond the point 113, as indicated by the broken line 114. From the point 113, the ideal increase in braking pressures would be as indicated by the dotted line 115, pressure increasing substantially more rapidly in the front wheel brakes than in the rear wheel brakes. In the present invention, increases in front and rear brake pressures take place as indicated by the line 116, the valve 63 closing at the point 113, and the pressure distribution throughout the remainder of the braking operation as at 116 being due to the action of the springs 40.

Operation

The operation of the form of the invention shown in FIGURES 1 to 4 inclusive is as follows:

The parts are shown in their normal positions in FIGURE 4, the valve seal 63 being unseated with the screw head 48 engaging the wall 49 and with the springs 40 expanded. The vehicle master cylinder (not shown) communicates with the port 58, and upon operation of the brake pedal, fluid will be displaced into the chamber 54. It will be understood that the mechanism of FIGURE 4 is duplicated in each rear wheel and that the action which takes place in the two wheel cylinders 30 is identical.

Fluid displaced from the master cylinder into the chamber 54 flows through passage 52, chamber 55 and passages 59 and 60 into the chamber 61 to move the plunger 32 to the left to engage the primary shoe brake lining 75 with the drum 17. The servo action of the brake shoes multiplies the actuating force to produce an increased braking force at the fulcrum point 67 to be partly transmitted to the anchor 18 and partly to the piston 44 through the lever 66.

When the brake torque reaches a predetermined value which, for example, may be that existing at .3W retarding force of the wheel at the road surface (W being the weight on a particular wheel), the spring 47 yields under the force transmitted to the piston head 45 and the valve seal 63 seats to close the passage 52, thus disconnecting the chambers 54 and 61. Beyond such point, fluid entering the chamber 54 from the master cylinder cannot flow to the chamber 61.

The valve seal 63 closes approximately at the point 113 in FIGURE 8 and up to this point, pressures will have increased equally in the front and rear wheel cylinders.

Beyond the point at which the valve seal 63 seats, any further increase in pressure in the master cylinder will continue to proportionately increase the pressure in the front wheel cylinders as indicated by the line 116, but from this line it will be apparent that increase in pressure in the rear wheel cylinders increases to a lesser degree. This lower rate of pressure in the rear wheel cylinders takes place by reason of the fact that increased pressures in the chamber 54 (FIGURE 4) will move the piston 38 to the left to compress the springs 40, the reduction in the capacity of the chamber 61 resulting in increased pressure therein with the increase taking place at a lower rate than the increase in pressure in the front wheels, as stated above. The springs 40 offer a gradually increasing resistance to movement of the piston 38 toward the left in FIGURE 4.

Thus the front and rear brakes are applied with equal pressure until the spring 47 yields, after which movement of the piston 38 to the left progressively increases pressure in the chamber 61 but at a substantially lower rate than occurs in the front wheel cylinders. This lower rate of increase in the chamber 61 and the higher rate of increase in the front wheel cylinders results in total braking forces comparable with standard practice. However, the pressure distribution is far more effective and the locking of the rear wheels is minimized and usually prevented. If the springs 40 are made to have a progressively increasing rate of resistance, the line 116 may coincide with the ideal curve 115. However, the straight line pressure increase represented by the line 16, taking place through the use of a constant spring rate in the springs 40, will deviate only a little from the line 115.

It will be apparent therefore that each rear wheel brake cylinder proportions the hydraulic pressure therein according to its torque output, which is in direct relation to the rate of deceleration of the car, or the weight transfer resulting from deceleration. Therefore, the wheel cylinders of the two rear wheels, while acting independently of each other, provide a definite cooperative relationship in that they automatically compensate for any braking difference due to differences in lining friction or other causes. The tendency is therefore to equalize the torque output of the two rear brakes so that one rear wheel will not maintain traction while the other locks. This is obviously a highly desirable characteristic of the functioning of the two rear wheel cylinders.

During the releasing of the brakes while the hydraulic pressure from the master cylinder is decreasing, the piston 38 moves to the right, the springs 40 effecting such movement as pressure drops in the chamber 54. When the master cylinder pressure reaches the level which existed when the valve seal 63 closed, the latter moves to the right in FIGURE 4 and re-establishes communication between the chambers 54 and 61 through passages 52, 59 and 60. Accordingly in such reverse operation of the parts the pressure distribution follows the same lines that it followed during pressure increases, that is, downwardly and to the left along the line 116 (FIGURE 8), to the point 113 and thence downwardly along the line 114 to the zero point 112.

The operation of the form of the device shown in FIGURES 5, 6 and 7 corresponds generally to that previously described. The chambers 92 and 91 normally communicate through the passage 90 and when the brake is operated by fluid from the master cylinder flowing from the port 58 into the chamber 91, the servo action of the brakes swings the lever 100 to the left at its lower end (FIGURE 5) to close the valve seal 89. Thereafter, pressures in the front wheel cylinders increase beyond the line 113 (FIGURE 8) as indicated by the line 116. Pressure increases in the chamber 92 act against the deformable body 83, acting as a piston, and fluid around the tapered portion 88 of the body 83 will be forced through passage 86 into the chamber 91, the body 83 being deformed against the flange of the piston 80 during such operation. The maximum deformation of the body 83 is shown in FIGURE 6.

The form of the invention shown in FIGURES 5, 6 and 7 is advantageous in some respects over the form shown in FIGURES 1 to 4. In the latter form of the invention, when the brake pedal is operated with the vehicle in reverse, braking takes place solely at the front wheel. In the form of the invention shown in FIGURE 5, the shoe edge 105 contacts the lever 100 to transmit force to the secondary brake shoe from the piston 81.

From the foregoing it will be apparent that the present mechanism provides total braking pressures comparable to total pressures provided through conventional brake mechanisms, but wherein a far more effective distribution of pressures is obtained. Total braking is minimized at the rear wheels to prevent the locking and sliding of the wheels, and use of the present device in the two rear wheel brake cylinders automatically equalizes the torque output of one rear brake with respect to the other.

It is to be understood that the forms of the invention shown and described are to be taken as preferred examples of the same and that various changes in the shape, size, and arrangement of the parts may be made as do not depart from the spirit of the invention or the scope of the appended claims.

I claim:

1. In a brake device for a vehicle wheel having brake shoes, a brake cylinder having a plunger therein movable to transmit force to the brake shoes to apply the brakes, said brake cylinder having a fluid chamber therein of which said plunger forms one wall, means comprising a fluid inlet for supplying fluid under pressure to said chamber to effect movement of said plunger, means operative when the brake develops a predetermined torque for closing communication between said inlet and said chamber, a pressure responsive member exposed to said inlet and movable to increase pressure in said chamber and having means for resisting such movement whereby, when communication is closed between said inlet and said chamber, said pressure responsive member will be moved against its resisting means by pressure in said inlet to increase pressure in said chamber, but at a rate lower than the rate of increase in pressure in said inlet.

2. In a brake device for a vehicle wheel having brake shoes, a brake cylinder having a plunger therein movable to transmit force to the brake shoes to apply the brakes, said brake cylinder having a fluid chamber therein of which said plunger forms one wall, an inlet chamber in said brake cylinder having an inlet port, a pressure movable member dividing said chambers and movable by pressure in said inlet chamber, said pressure movable member having means for resisting its movement toward said fluid chamber, means normally connecting said chambers whereby fluid flowing into said inlet chamber flows into said fluid chamber to operate said plunger, and means operative when the brake device develops a predetermined torque for closing communication between said chambers whereby increases in pressures in said inlet chamber will move said pressure movable member against its resisting means to build up pressures in said fluid chamber at a rate lower than the rate of increase in pressure in said inlet chamber.

3. A device according to claim 2 wherein said pressure movable member comprises a plunger, and wherein the resisting means for said plunger comprises a spring opposing movement of said pressure movable member by pressure in said inlet chamber.

4. In a brake device for a vehicle wheel having connected primary and secondary brake shoes subject to a servo action when applied, a brake cylinder having a plunger therein movable to transmit force to the primary brake shoe to apply the brakes, said brake cylinder having a fluid chamber therein of which said plunger forms one wall, means comprising a fluid inlet for supplying fluid under pressure to said chamber to effect movement of said plunger, means connected to said secondary brake shoe and operative upon movement thereof incident to the development of a predetermined torque in the brake device for closing communication between said inlet and said chamber, and means separate from said second-named means thereafter operative by pressure in said inlet for increasing the pressure of the fluid in said chamber at a rate lower than the rate of increase in pressure in said inlet.

5. In a brake device for a vehicle wheel having connected primary and secondary brake shoes subject to a servo action when applied, a brake cylinder having a plunger therein movable to transmit force to the primary brake shoe to apply the brakes, said brake cylinder having a fluid chamber therein of which said plunger forms one wall, means comprising a fluid inlet for supplying fluid under pressure to said chamber to effect movement of said plunger, means connected to said secondary brake shoe and operative upon movement thereof incident to the development of a predetermined torque in the brake device for closing communication between said inlet and said chamber, a pressure responsive member exposed to said inlet and movable to increase pressure in said chamber and having means for resisting such movement whereby, when communication is closed between said inlet and said chamber, said pressure responsive member will be moved against its resisting means by pressure in said inlet to increase pressure in said chamber but at a rate lower than the rate of increase in pressure in said inlet.

6. In a brake device for a vehicle wheel having connected primary and secondary brake shoes subject to a servo action when applied, a brake cylinder having a plunger therein movable to transmit force to the primary brake shoe to apply the brakes, said brake cylinder having a fluid chamber therein of which said plunger forms one wall, an inlet chamber in said brake cylinder having an inlet port, a pressure movable member dividing said chambers and movable by pressure in said inlet chamber, and having means for resisting its movement toward said fluid chamber, means normally connecting said chambers whereby fluid flowing into said inlet chamber flows into said fluid chamber to operate said plunger, and means connected to said secondary brake shoe and operative upon movement thereof incident to the development of a predetermined brake torque for closing communication between said chambers whereby increases in pressures in said inlet chamber will move said pressure movable member against its resisting means to build up pressures in said fluid chamber at a rate lower than the rate of increase in pressures in said inlet chamber.

7. In a brake device for a vehicle wheel having connected primary and secondary brake shoes subject to a servo action when applied, a brake cylinder having a plunger therein movable to transmit force to the primary brake shoe to apply the brakes, said brake cylinder having a fluid chamber therein of which said plunger forms one wall, means for supplying fluid under pressure to said chamber to effect movement of said plunger, a piston carried by said brake cylinder and projecting therefrom and provided with a normally open valve movable by said piston to close said valve and close said fluid supplying means, to said chamber, a lever connected between said secondary brake shoe and said piston to move said valve to closed position when said secondary shoe moves said lever incident to the development of a predetermined brake torque, and means operative by pressure in said fluid supplying means after said valve is closed for increasing the pressure of the fluid in said chamber at a rate lower than the rate of increase in pressure in said inlet.

8. A device according to claim 7 wherein said means for increasing pressure of the fluid in said chamber after said valve is closed comprises a pressure responsive member movable to reduce the volume of said chamber and operative by pressure from said fluid supplying means.

9. A device according to claim 10 wherein said brake cylinder is provided with an inlet chamber communicating with said fluid supplying means, said means for increasing pressure of fluid in said fluid chamber after said valve closes comprising a plunger dividing said chambers and having means resisting its movement toward said fluid chamber whereby increasing pressures in said inlet chamber after said valve is closed, will move said last named plunger against its resisting means to reduce the volume of said fluid chamber.

10. In a brake mechanism, a brake device for each of the rear wheels of a vehicle wherein each such wheel is provided with brake shoes, each brake device comprising a brake cylinder having a plunger therein movable to transmit force to the associated brake shoes to operate them, said brake cylinder having a fluid chamber of which said plunger forms one wall, means comprising a fluid inlet for supplying fluid under pressure to said chamber to effect movement of said plunger, means operative when the associated brake shoes develop a predetermined torque for closing communication between said inlet and said chamber, a pressure responsive member exposed to said inlet and movable to increase pressure in said chamber and having means for resisting such movement whereby, when communication is closed between said inlet and said chamber, said pressure responsive member will be moved against its resisting means by pressure in said inlet to increase pressure in said chamber, but at a rate lower than the rate of increase in pressure in said inlet, both brake devices being operative in accordance with the same predetermined torque whereby each brake device equalizes itself relative to the other brake device.

11. In a brake mechanism, a brake device for each of the rear wheels of a vehicle wherein each such wheel is provided with brake shoes, each brake device comprising a brake cylinder having a plunger therein movable to transmit force to the associated brake shoes to operate them, said brake cylinder having a fluid chamber of which said plunger forms one wall, an inlet chamber in said brake cylinder having an inlet port, a pressure movable member dividing said chambers and movable by pressure in said inlet chamber to reduce the volume of said fluid chamber, said pressure movable member having means for resisting its movement toward said fluid chamber, means normally connecting said chambers whereby fluid flowing into said inlet chamber flows in said fluid chamber to operate said plunger, and means operative when the associated brake device develops a predetermined torque for closing communication between said chambers whereby increases in pressures in said inlet chamber will move said pressure movable member against its resisting means to build up pressures in said fluid chamber at a rate lower than the rate of increase in pressure in said inlet chamber, both brake devices being operative in accordance with the same predetermined torque whereby each brake device equalizes itself relative to the other brake device.

12. In a brake device for a vehicle wheel having connected primary and secondary brake shoes subject to a servo action when applied, a brake cylinder having a plunger therein movable to transmit force to the primary brake shoe to apply the brakes, said brake cylinder having a fluid chamber therein of which said plunger forms one wall, an inlet chamber in said brake cylinder having an inlet port, a pressure responsive device dividing said chambers and comprising a deformable member exposed to pressure in said inlet chamber to be deformed by such pressure to reduce the volume of said fluid chamber, said pressure responsive device having a passage normally connecting said chambers whereby fluid flowing into said inlet chamber flows into said fluid chamber to operate said plunger, and means connected to said secondary brake shoe and operative upon movement thereof incident to the development of a predetermined brake torque for closing said passage whereby increases in pressure in said inlet chamber will deform said deformable member under the resistance of its inherent resiliency to build up pressure in said fluid chamber at a rate lower than the rate of increase in pressures in said inlet chamber.

13. In a brake device for a vehicle wheel having brake shoes, a hydraulic brake cylinder comprising piston means to actuate the brake shoes to produce a brake torque, a hydraulic pressure inlet for hydraulic fluid under pressure, hydraulic pressure modifying means to gradually reduce the hydraulic pressure transmitted to said piston means in a predetermined progressive ratio to compensate for weight transfer of the vehicle during deceleration, valve means connected to bypass said hydraulic pressure modifying means to transmit fluid pressure from said inlet to act on said piston means directly without reduction, and means responsive to the brake torque produced arranged to close said valve means when a predetermined brake torque is reached to thereby prevent the bypass of fluid so that fluid pressure is transmitted by said hydraulic pressure modifying means and the pressure on said piston means increases at a lower rate than the pressure of the fluid entering said inlet.

References Cited in the file of this patent

UNITED STATES PATENTS

| | | |
|---|---|---|
| 2,213,948 | Bowen | Sept. 10, 1940 |
| 2,385,168 | Stelzer | Sept. 18, 1945 |
| 2,513,015 | Fike | June 27, 1950 |
| 2,997,139 | Brisson | Aug. 22, 1961 |
| 3,047,099 | Dahle | July 31, 1962 |